US007156267B2

(12) United States Patent
Zanga

(10) Patent No.: US 7,156,267 B2
(45) Date of Patent: Jan. 2, 2007

(54) VALVE UNIT FOR FILLING MACHINES

(75) Inventor: Francesco Zanga, Parma (IT)

(73) Assignee: Simonazzi S.p.A., Parma (IT)

( * ) Notice: Subject to any disclaimer, the term of this patent is extended or adjusted under 35 U.S.C. 154(b) by 0 days.

(21) Appl. No.: 10/492,554

(22) PCT Filed: Sep. 26, 2002

(86) PCT No.: PCT/IT02/00615

§ 371 (c)(1),
(2), (4) Date: Apr. 14, 2004

(87) PCT Pub. No.: WO03/040022

PCT Pub. Date: May 15, 2003

(65) Prior Publication Data

US 2005/0001184 A1 Jan. 6, 2005

(30) Foreign Application Priority Data

Nov. 9, 2001 (EP) ................................. 01830693

(51) Int. Cl.
*F16K 31/143* (2006.01)

(52) U.S. Cl. ...................... 222/504; 222/168; 222/559; 141/146; 251/63; 251/63.4; 251/63.5; 251/324

(58) Field of Classification Search ......... 251/62–63.5, 251/324; 222/168, 504, 559; 141/144–146
See application file for complete search history.

(56) References Cited

U.S. PATENT DOCUMENTS 3,219,056 A * 11/1965 Dyson ..................... 137/514.7
5,217,043 A * 6/1993 Novakovic .................. 137/460
5,678,595 A * 10/1997 Iwabuchi .................... 137/341
5,788,127 A 8/1998 Hanmer
5,915,410 A * 6/1999 Zajac ......................... 137/341
6,082,418 A * 7/2000 Naecker et al. ............. 141/145

FOREIGN PATENT DOCUMENTS

FR 2 801 579 A1 6/2001
JP 6-135491 A1 * 5/1994 ................. 251/366
WO 99/39978 A1 8/1999

OTHER PUBLICATIONS

International Search Report dated Feb. 6, 2003, for Application No. PCT/IT02/00615.

* cited by examiner

*Primary Examiner*—J. Casimer Jacyna
(74) *Attorney, Agent, or Firm*—Hogan & Hartson LLP

(57) ABSTRACT

The present invention relates to a valve unit for container filling machines, particularly for bottle fillers. More particularly, the present invention relates to a valve unit (1), particularly for machines for filling containers (8), comprising a hollow body (2) in which a plug (3) is slidably housed and a guide means (14) for the said plug (3), a passage (9) being formed in the said hollow (2) for a fluid (7) for filling the said container (8), characterized in that the said passage (9) for the said filling fluid (7) is separated from the said guide means (14) and from the said plug (3) by an isolating and sealing membrane (32), the said membrane being open at the bottom in such a way as to allow a tip (30) of the to protrude downwards.

18 Claims, 3 Drawing Sheets

VALVE UNIT FOR FILLING MACHINES

The present invention relates to a valve unit for container filling machines, particularly for bottle fillers.

In the field of equipment for bottling beverages, there is a known need for ensuring the maximum asepsis of all parts of the machine which come into contact with the beverage and for ensuring that the flow of the beverage from appropriate reservoirs cannot come into contact with external contaminants during its passage to the supply nozzle. It is this nozzle that is generally subject to the greatest risk of contamination, both because it has supply aperture—and therefore exposure to the external air—and because its structure comprises mechanisms and moving parts that are difficult to clean and air vents which can also act as a carrier of external contaminants.

Consequently, the design of what are called “aseptic” valves has naturally been widely investigated. A valve has been proposed in which the plug is enclosed by an elastic membrane of plastic material which isolates the channel in which the beverage flows from the mechanisms connected to the plug. However, this valve also has certain problems, such as a lack of versatility, in terms of adaptation to the various filling systems, and a high degree of wear of the elastic membrane, particularly at the point at which, when the valve is closed, it comes into contact with the edge of the supply aperture of the valve unit to shut off the aperture.

The problem which the present invention is designed to, tackle is therefore that of providing a valve unit for filling machines which overcomes the problems inherent in the valves according to the prior art.

This problem is resolved by a valve unit as specified in the attached claims.

Further characteristics and advantages of the valve unit for filling machines according to the present invention will be made clearer by the description of a preferred embodiment, provided below for guidance and without restrictive intent, with reference to the following figures, in which.

With reference to the figures, the valve unit according to the invention, indicated as a whole by the number 1, comprises a hollow body 2 in which a plug 3 is slidably housed.

Figure 4:
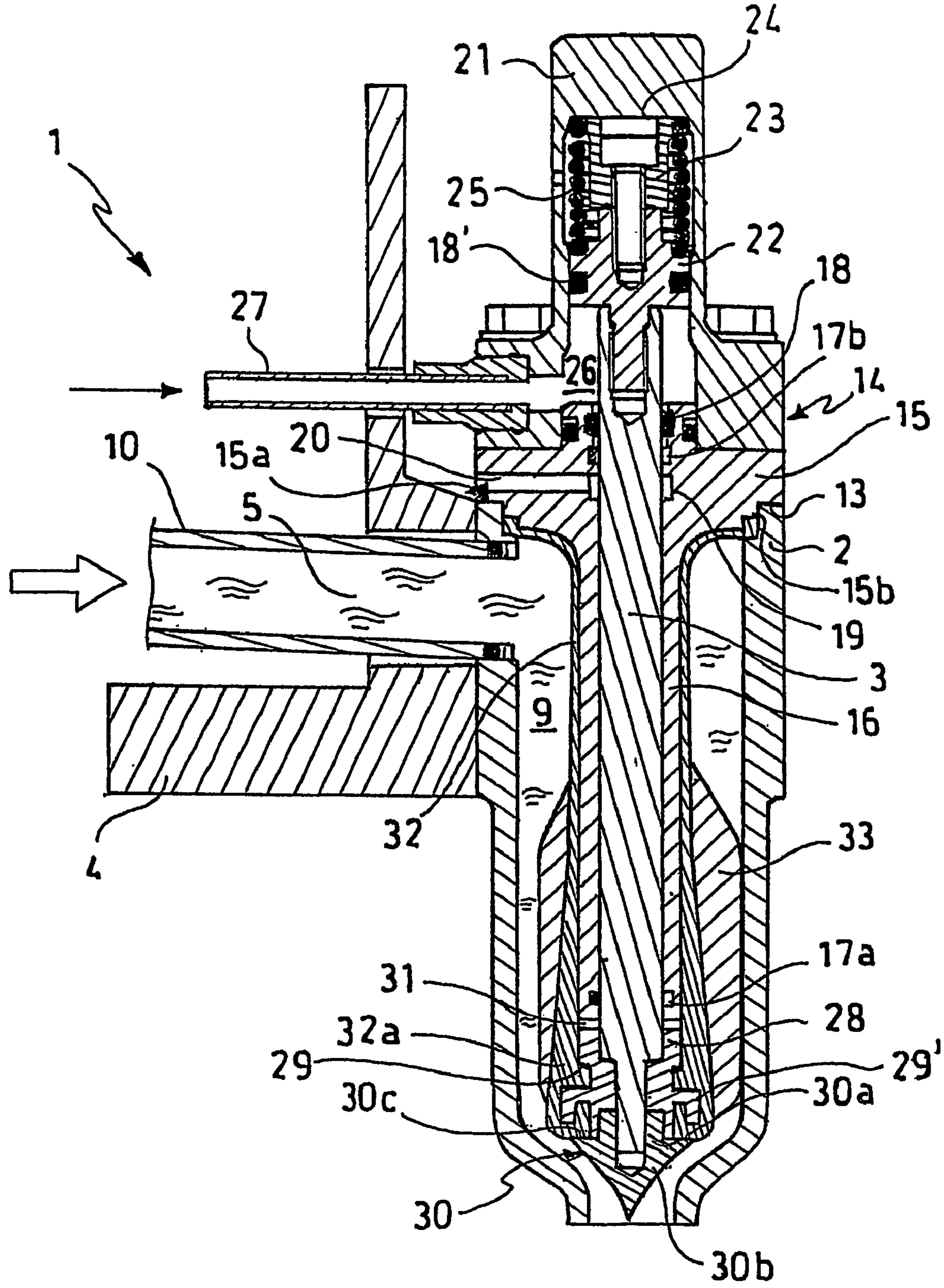

FIG. 4 shows a sectional side view of a further embodiment of the valve unit of the invention;

The body 2 is fixed to the frame of the filling machine by suitable attachment means 4, such as struts or other connecting elements.

The hollow body 2 comprises an inlet aperture 5 and an outlet aperture 6 for the fluid 7 with which the container 8 is to be filled. The said inlet aperture 5 is located in the upper portion of the lateral surface of the hollow body 2, while the outlet aperture 6 is formed on the lower surface of the hollow body 2, in alignment with the plug 3. Thus a passage 9 for the filling fluid 7 is formed inside the said hollow body 2, this passage being of essentially annular shape because the cavity is occupied coaxially by the plug 3.

A line 10 for supplying the filling fluid 7 is connected to the inlet aperture 5.

The hollow body 2 of the valve unit 1 is essentially cylindrical in shape, and has a diameter, in cross section, which is greater than the diameter of the outlet aperture 6. The connecting portion 11 between the cylindrical body of greater diameter and the outlet aperture 6 has an inflected shape in section, so that it terminates in a cylindrical portion of smaller diameter 12 in which is formed the said outlet aperture 6 for the filling fluid 7.

The valve unit 1 also comprises guide means 14 for the plug 3. These guide means 14 comprise a pierced plate 15 fixed to the upper edge 13 of the hollow body 2. The lower surface of the pierced plate 15 has, in section, a double step shape, having two annular downward-facing shoulders. The, upper shoulder 15*a* is designed to engage with the upper edge 13 of the hollow body 2, which in turn has a stepped shape, in such a way as to provide accurate centring of the plug 3 with respect to the hollow body 2. On the other hand, the lower shoulder 15*b* forms a recess between the shoulder formed by the step of the edge 13 of the hollow body 2 and the pierced plate 15. A hollow stem 16, designed to house the plug 3 in a slidable way, extends downwards from the lower surface of the pierced plate 15, but not as far as the vicinity of the outlet aperture 6.

A sliding guide 17*a* of the open ring type, designed to interact with the surface of the plug 3, is located in a suitable seat on the inner surface of the said hollow stem 16, in the proximity of its lower end.

A second sliding guide 17*b*, also of the open ring type, is located in the proximity of the opposite end, on the inner surface of the hole in the plate 15. A seal 18, for example a V-ring, is located in a suitable seat on the same surface, above the said sliding guide 17*b*. Additionally, an annular cavity 19, communicating with an air vent duct 20 which opens on the outside of the valve unit 1, is formed below the sliding guide 17*b*.

The sliding guides 17*a*, 17*b* are generally made from suitable plastic material.

A head 21 which closes the top of the valve unit 1 is fixed above the pierced plate 15. The head 21 is hollow and houses within it the upper portion of the, plug 3 which, as stated, extends downwards from this point, being housed coaxially within the central hole of the guide means 14, until it reaches the outlet aperture 6 of the hollow body 2.

More particularly, the plug 3 is of solid cylindrical shape and has a diameter slightly smaller than the internal diameter of the hollow stem 16, so that a clearance is created between the two surfaces. The plug 3 is fixed at its top to a piston 22 housed slidably in the cavity of the head 21. Above the piston 22 are located travel limiting means 23, which in this specific example are a cylinder with a diameter smaller than the internal diameter of the cavity of the head 21 and with a height smaller than the space, measured when the valve is closed, between the upper surface of the piston 22 and the internal end surface 24 of the head 21, the resulting empty space determining the travel of the piston 22. A spring 25, wrapped around the cylinder 23, presses on the said upper surface of the piston and on the internal end surface 24.

A seal 18', of the V-ring type for example, is housed in a suitable seat on the outer surface of the piston 22.

A pressurization chamber 26, formed under the piston 22, communicates with a pressurization duct 27 for the introduction of compressed air, which, in conjunction with the piston 22, forms the means of actuating the plug 3.

Known fixing means, for example a screw and nut system, are used to fix the cylinder 23 to the piston 22 and to fix the piston 22 to the plug 3.

The lower end of the plug 3 is below the hollow stem 16 of the guide means 14, and this lower end is fixed to a support element 28. The support element 28 comprises an upper portion with a larger external diameter, connected to the lower portion by a shoulder 29.

The support element 28 has a central through hole, coaxial with the plug 3 and housing the lower end of the plug. A tip 30 is fixed removably, by a screw fitting for example, to the end part of the plug 3 which extends below the support element 28. This tip 30 is essentially arrow-shaped; in other words, it has a cylindrical portion 30*a* for joining to the plug 3, an essentially conical pointed portion 30*b* and an upward-facing connecting shoulder 30*c*. The pointed portion 30*b* can be of ogival shape, in other words with an external convexity, or, as shown in the figure, can have a concave profile in cross section, such that the flow of filling fluid 7 is directed and guided towards the mouth of the container 8. In all cases, the tip 30 is interchangeable, according to the requirements of the type of filling and the type of container and/or beverage.

An annular gap 31 is formed between the upper edge of the support element 28 and the lower edge of the hollow stem 16.

A membrane 32 of essentially cylindrical shape, open at both ends, is placed outside the guide means 14, and encloses the hollow stem 16 like a jacket. The membrane 32 is fixed at its top between the edge of the hollow body 2 and the pierced plate 15 of the guide means 14, the upper flap of the membrane being housed in the recess formed by the lower shoulder 15*b* of the pierced plate 15. The lower portion 32*a* of the membrane 32 is thickened and comprises an inner flange 32*b* which is retained between the shoulder 29 of the support element 28 and the connecting shoulder 30*c* of the tip 30. The greater thickness of the lower portion 32*a* of the membrane permits satisfactory deformation of the material when the valve is closed, in other words when this lower portion 32*a* interferes with the inner surface of the connecting portion 11 of the hollow body 2 to ensure the tightness of the valve. At the same time, the wear of the material is limited and consequently the durability of the membrane is increased.

On the outer surface of the membrane 32 there is a plurality of fins 33, extending radially essentially until they come into contact with the inner wall of the hollow body 2. Preferably, these fins 33, which have the function of stabilizing the flow of liquid and impeding torsional motion thereof, are positioned on the lower part of the membrane 32, essentially on the lower portion 32*a*.

The membrane 32 is made from a suitable elastomer, such as natural or synthetic rubber. Preferably, the membrane 32 and the fins 33 are made in one piece.

The operation of the valve unit according to the invention will now be described, again with reference to the figures.

Figure 1:
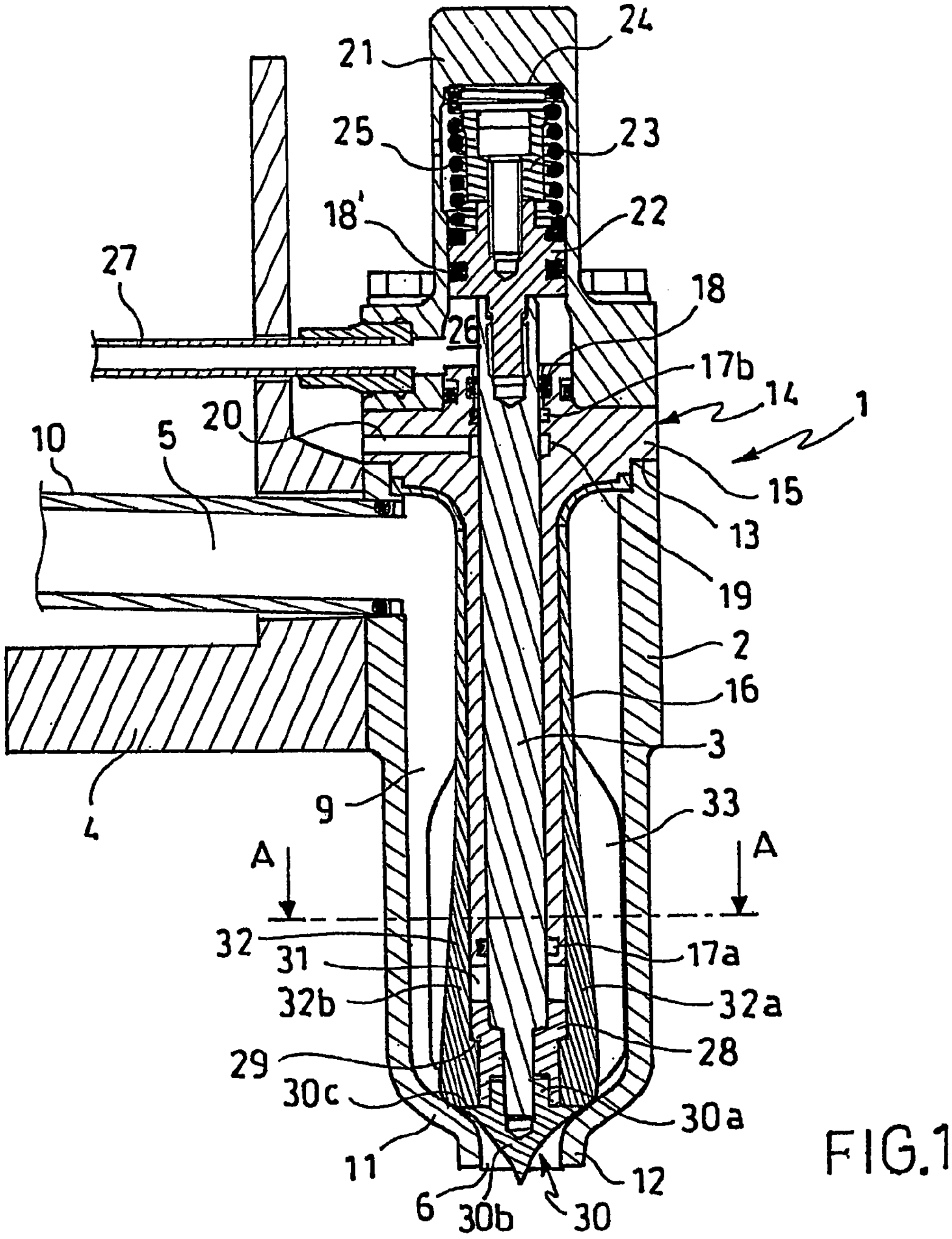
FIG. 1 shows a sectional side view of the valve unit according to the invention, in the closed state.
Figure 2:
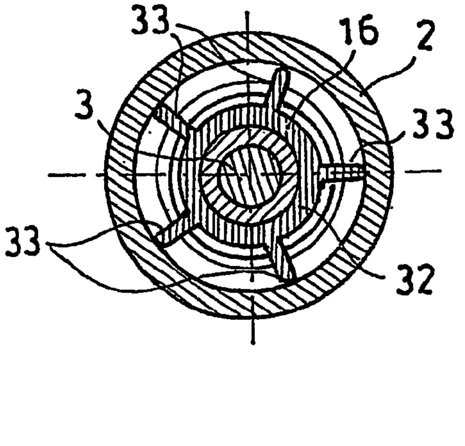
FIG. 2 shows a sectional view in the direction A—A in FIG. 1.

In the closed state, the valve unit 1 appears as shown in FIG. 1. In this state, the tip 30 and the lower portion 32*a* of the membrane 32 interact to form a seal with the inner surface of the connecting portion 11 of the hollow body 2.

Figure 3:
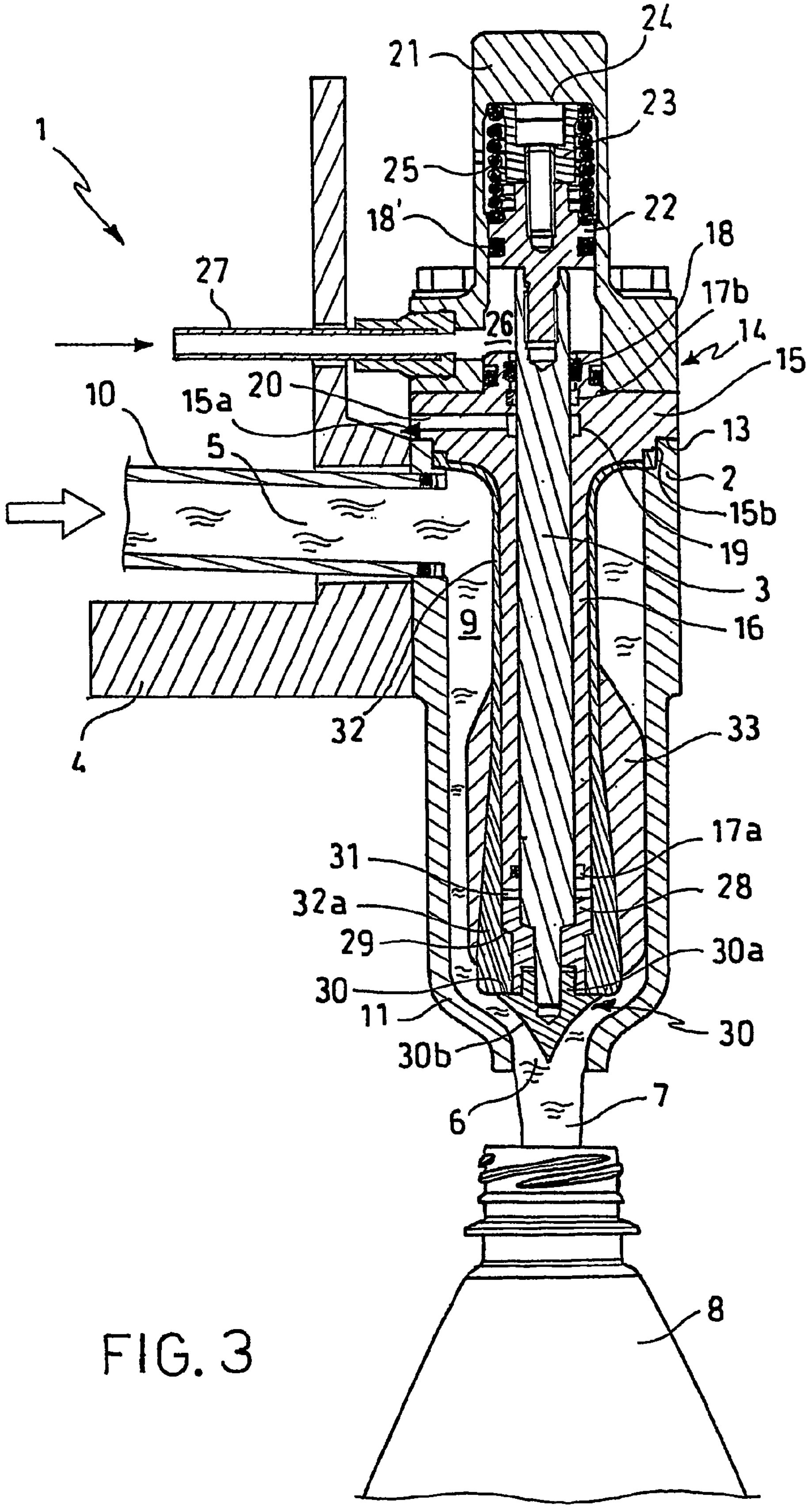
FIG. 3 shows the view of FIG. 1, but with the valve in the open state and during supply.

The valve is opened by introducing compressed air, through the pressurization duct 27, into the pressurization chamber 26. Under the action of the compressed air, the piston 22 rises, thus moving the plug 3 which is integral with it. The spring 25 is compressed until the cylinder 23 abuts the inner surface 24 of the head 21, thus stopping the upward travel of the plug 3. Thus the valve is opened, allowing the filling fluid 7 to be supplied into the container 8, as shown in FIG. 3.

When the plug 3 is raised, the support element 28 which is integral with it also slides upwards, advancing towards the lower edge of the hollow stem 16 which is fixed. The volume of the annular gap 31 is thus reduced, causing the air contained in it to be vented upwards through the clearance between the plug 3 and the hollow stem 16 and, at the position of the sliding guide 17*a*, through the space left by the open ring. The air is then eliminated through the vent duct 20, thus preventing the occurrence of what is known as the "pump effect" of air compression within the gap 31, which would hinder the operation of the plug 3.

On completion of the supply of the filling fluid 7, the introduction of compressed air through the pressurization duct 27 is halted, and the spring 25 is released, causing the plug 3 to close the outlet 6 of the hollow body 2.

The compressed air is introduced into the valve unit 1 through a solenoid valve (not shown) operated by a control unit. The quantity of fluid supplied is monitored by known flow measuring means.

In the embodiment of the valve shown in FIG. 4, the membrane 32 is fixed to the support element 28 in an advantageous way by providing an L-section flange 29' on the outer surface of this support element 28, below the shoulder 29. This flange 29' is positioned in a complementary seat formed in the thickened part of the membrane 32, forming hooked gripping means between the membrane and the plug 3.

The advantages of the valve unit to which the present invention relates are immediately evident from the above description.

In the first place, the membrane 32 enables the internal mechanisms of the valve to be completely isolated from the passage 9 of the filling fluid 7, which can therefore be supplied in totally aseptic conditions.

Furthermore, the thickening of the lower portion 32*a* of the membrane 32, in other words of the portion more subject to mechanical stress, prolongs the service life of the membrane and allows the material to be deformed sufficiently to ensure a perfect valve seal.

The presence of the fins 33 on the outer surface of the membrane 32 prevents torsional motion of the fluid during supply, this being a particularly important requirement when the valve is fitted to rotary machines in which such torsional motion is more significant.

The provision of an interchangeable tip 30, a characteristic resulting from the fact the membrane 32 is open at the bottom, enables the performance of the valve to be matched to the characteristics of the container (for example, the mouth size, the capacity of the bottle, etc.) and to those of the beverage, simply by changing the type and shape of the tip 30, but without any need for changes to the membrane 32 (which would entail very great additional costs).

The provision of the sliding guides 17*a*, 17*b* at a considerable axial distance from each other on the inner surface of the guide means 14 ensures that the plug 3 is perfectly coaxial with the hollow body 2, resulting in high precision of supply.

Clearly, only a particular embodiment of the valve unit to which the present invention relates has been described here, but a person skilled in the art will be able to make any necessary modifications to the invention to adapt it to particular applications, without departing from the scope of protection of the present invention.

For example, it is possible to provide more than two sliding guides 17*a*, 17*b*.

The actuating means of the plug 3, which in the present example are of the compressed air type, can be replaced by other known means, for example cam means.

The inflected shape of the connecting portion 11 of the hollow body 2 can be varied to meet specific requirements.

The invention claimed is:

1. Valve unit, particularly for machines for filling containers, comprising a hollow body in which a plug is slidably housed and a guide means for the said plug, a passage being formed in the said hollow body for a fluid for filling the said container, wherein the said passage for the said filling fluid is separated from the said guide means and from the said plug by an isolating and sealing membrane, the said membrane being open at the bottom in such a way as to allow a tip of the said plug to protrude downwards, wherein the said tip is detachably coupled to the said plug, the bottom of the said membrane having an inner flange which is retained between the said plug and the said tip.

2. Valve unit according to claim 1, in which the said membrane comprises a lower portion of greater thickness.

3. Valve unit according to claim 1, in which the said membrane comprises a plurality of fins for stabilizing the flow of the said filling fluid.

4. Valve unit according to claim 1, in which the said hollow body comprises an inlet aperture and an outlet aperture for the said fluid, the said outlet aperture being positioned below and in alignment with the said plug, the cylindrical portion of the said hollow body and the said outlet aperture being connected by a connecting portion having an inflected shape in cross section.

5. Valve unit, particularly for machines for filling containers, comprising a hollow body in which a plug is slidably housed and a guide means for the said plug, in which the said guide means are located outside the said plug, a passage being formed in the said hollow body for a fluid for filling the said container, wherein the said passage for the said filling fluid is separated from the said guide means and from the said plug by an isolating and sealing membrane, the said membrane being open at the bottom in such a way as to allow a tip of the said plug to protrude downwards, wherein the said tip is detachably coupled to the said plug, the bottom of the said membrane having an inner flange which is retained between the said plug and the said tip.

6. Valve unit according to claim 1, in which the said guide means are located outside the said plug and comprise a pierced plate from which there extends downwards a hollow stem designed to house the said plug coaxially and slidably.

7. Valve unit according to claim 5, in which the said guide means comprise at least two sliding guides spaced apart from each other in such a way as to ensure that the said plug is coaxial and in alignment with the said outlet aperture.

8. Valve unit according to claim 7, in which the said sliding guides are of the open ring type.

9. Valve unit according to claim 1, in which the said guide means comprise an air vent duct.

10. Valve unit according to claim 1, in which the said tip of the said plug is essentially arrow-shaped in cross section.

11. Valve unit according to claim 10, in which the said tip comprises an essentially conical pointed portion, having a concave profile in cross section.

12. Valve unit, particularly for machines for filling containers, comprising a hollow body in which a plug is slidably housed and a guide means for the said plug, a passage being formed in the said hollow body for a fluid for filling the said container, wherein in that the said passage for the said filling fluid is separated from the said guide means and from the said plug by an isolating and sealing membrane, the said membrane being open at the bottom in such a way as to allow a tip of the said plug to protrude downwards, in which means of actuating the said plug are provided, wherein the said tip is detachably coupled to the said plug, the bottom of the said membrane having an inner flange which is retained between the said plug and the said tip.

13. Valve unit according to claim 12, in which the said means of actuating the plug comprise a piston which is integral with the upper end of the said plug and a pressurization chamber associated for operation with the said piston, the said pressurization chamber communicating with a pressurization duct for the introduction of compressed air at a sufficient pressure to raise the said piston.

14. Valve unit according to claim 13, the said piston also being associated with an opposing spring and travel limiting means for the said piston.

15. Valve unit according to claim 12, in which the said plug comprises a support element positioned above the said tip and interacting with the said tip to retain the lower flap of the said membrane.

16. Valve unit according to claim 15, in which the said support element comprises hooked gripping means of the said membrane to the said support element.

17. Filling machine, the improvement comprising one or move valve units, each of the said one or more valve units comprising a hollow body in which a plug is slidably housed and a guide means for the said plug, a passage being formed in the said hollow body for a fluid for filling the said container, wherein the said passage for the said filling fluid is separated from the said guide means and from the said plug by an isolating and sealing membrane, the said membrane being open at the bottom in such a way as to allow a tip of the said plug to protrude downwards, wherein the said tip is detachably coupled to the said plug, the bottom of the said membrane having an inner flange which is retained between the said plug and the said tip.

18. Filling machine according to claim 17, in which the said machine is of the rotary type.

* * * * *